J. R. GERARD.
LOCOMOTIVE DRAFT REGULATOR.
APPLICATION FILED AUG. 10, 1917.

1,309,516.

Patented July 8, 1919.
2 SHEETS—SHEET 1.

WITNESSES

INVENTOR
J. R. Gerard,
BY Victor J. Evans
ATTORNEY

J. R. GERARD.
LOCOMOTIVE DRAFT REGULATOR.
APPLICATION FILED AUG. 10, 1917.

1,309,516.

Patented July 8, 1919.
2 SHEETS—SHEET 2.

WITNESSES

INVENTOR
J. R. Gerard,
BY Victor J. Evans
ATTORNEY

UNITED STATES PATENT OFFICE.

JOSEPH R. GERARD, OF PARSONS, KANSAS.

LOCOMOTIVE DRAFT-REGULATOR.

1,309,516.  Specification of Letters Patent.  Patented July 8, 1919.

Application filed August 10, 1917. Serial No. 185,513.

*To all whom it may concern:*

Be it known that I, JOSEPH R. GERARD, a citizen of the United States, residing at Parsons, in the county of Labette and State of Kansas, have invented new and useful Improvements in Locomotive Draft-Regulators, of which the following is a specification.

This invention has reference to improvements in draft regulators of locomotives in general, and is particularly directed to means for insuring the positive actuation of the controlling means.

It is the primary object of the present invention to provide a peculiar construction of valves and seats therefor for the exhaust steam of a locomotive which is let out of the smoke stack thereof, having means associated therewith for cleaning both the valves and seats from an accumulation of ash, soot, etc., which might be deposited thereon.

It is a still further object of the invention to produce means whereby a fluid may be directed to all the parts of the slidable valves and to the seats upon which the said valves are arranged, regardless of the condition of the valves upon their said seats.

With the foregoing objects in view and others which will appear as the nature of the invention is more fully understood, the improvement resides in the construction, combination and operative arrangement of parts set forth in the following description and pointed out with particularity in what is claimed.

Figure 1:
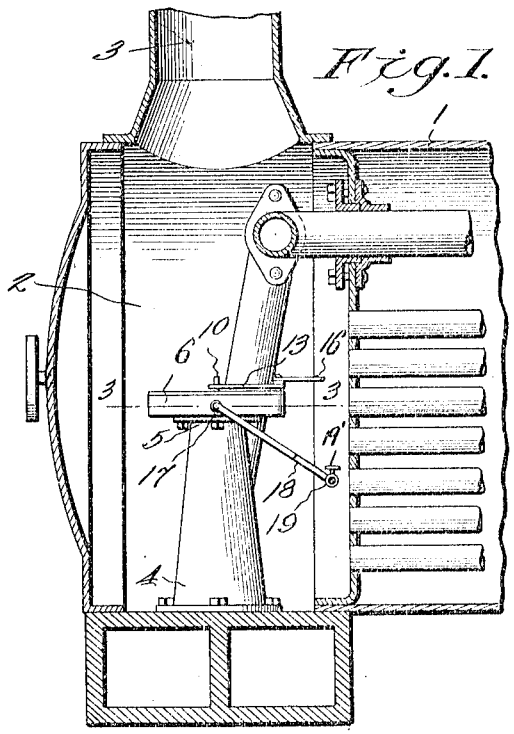
Figure 1 is a vertical longitudinal sectional view through the smoke box of a locomotive provided with my improvement.
Figure 2:
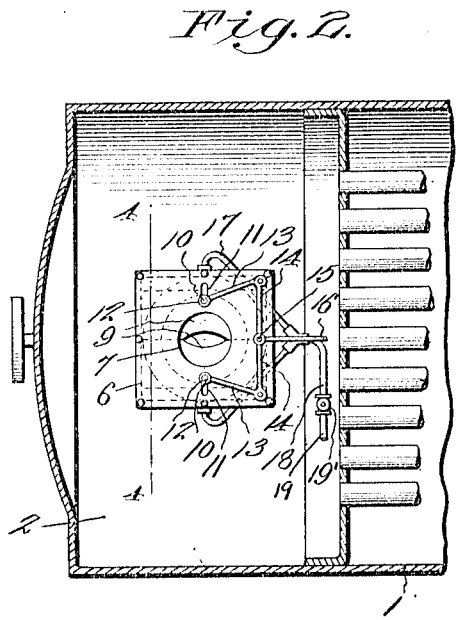
Fig. 2 is a horizontal sectional view approximately on the line 2—2 of Fig. 1, showing the improvement in plan.
Figure 3:
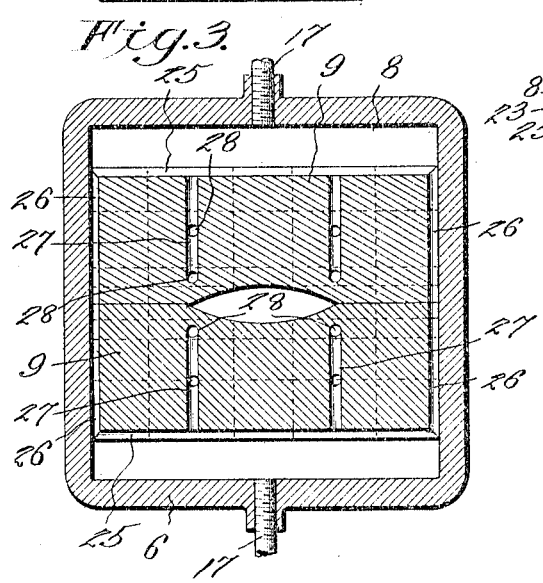
Fig. 3 is a greatly enlarged horizontal sectional view approximately on the line 3—3 of Fig. 1.
Figure 4:
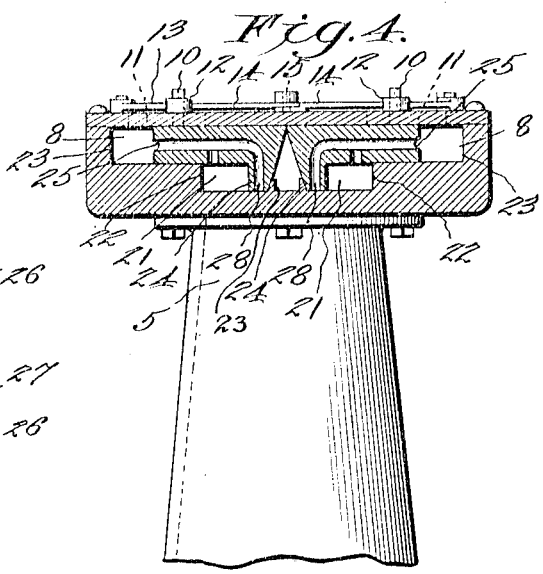
Fig. 4 is a transverse sectional view approximately on the line 4—4 of Fig. 2.
Figure 5:
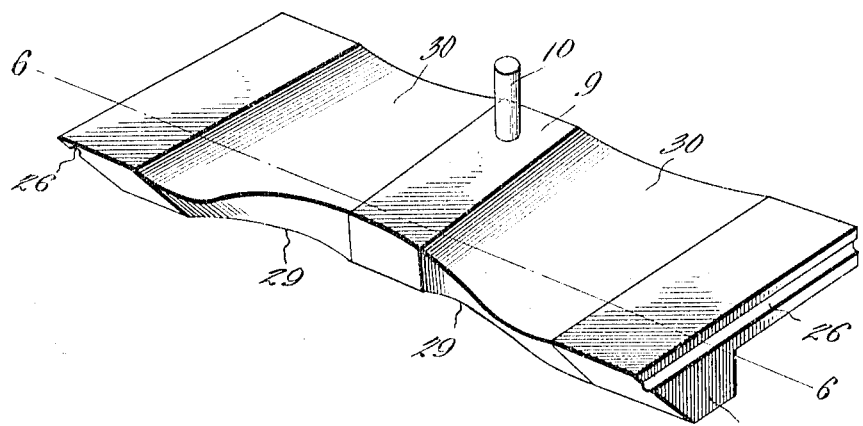
Fig. 5 is a perspective view of one of the slidable valve members.
Figure 6:
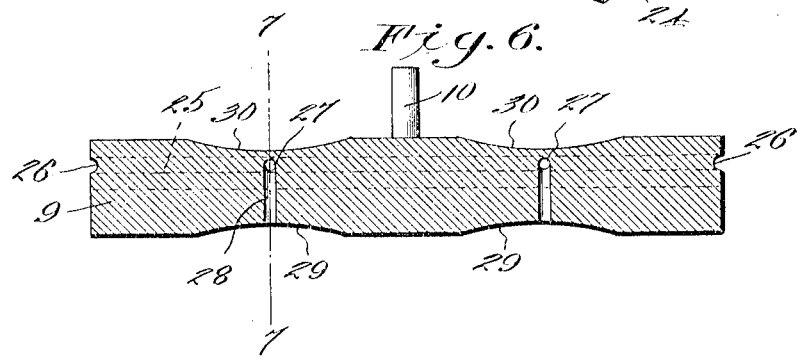
Fig. 6 is a sectional view approximately on the line 6—6 of Fig. 5, and upon an enlarged scale.
Figure 7:
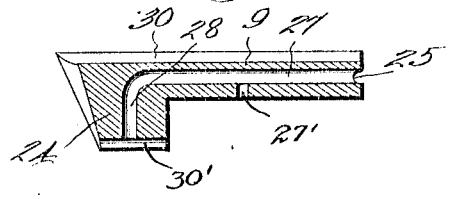
Fig. 7 is a sectional view approximately on the line 7—7 of Fig. 6.

While in the drawings I have illustrated only a portion of a locomotive, it is here to be stated, that the valve controlling the fluid from the exhaust to the seats for the sliding valves may be and preferably is arranged in and operable from the cab of the locomotive.

The locomotive is indicated by the numeral 1 and the smoke box therefor by the numeral 2, while the smoke stack is indicated by the numeral 3.

Arranged in the smoke box 2 is a nozzle 4 which has its lower end communicating with the exhaust from the boiler of the locomotive. The nozzle 4, at the upper end thereof is preferably formed with a substantially cone-shaped mouth 5, and arranged over the mouth and secured to the nozzle in any desired or preferred manner is a substantially rectangular head 6. The head is, of course, provided with an opening that communicates with the nozzle 4. The head, at the outer portion thereof is formed with a depression 8 that provides the seat for the slidable valves 9—9. The depressed or hollow head is closed by a suitable plate which is preferably bolted thereto, and the said plate has a central preferably round opening 7 that is arranged directly below the smoke stack 3. Each of the valves 9 is approximately centrally provided with an upstanding lug 10, each of which passing through an elongated slot 11 in the cover plate for the head 8. To each of the lugs 10 is pivotally secured one arm 13 of a bell crank lever 14, each of the said levers being pivotally connected to the cover plate for the head, and the free arms of the said bell crank levers are pivoted, as at 15 to an operating rod 16. The rod 16 is directed (preferably by suitable connections therewith) to the cab for the locomotive and a pull thereon will cause the valves 9 to slide on their seat in one direction, while a push thereon will cause the valves to move on their seat in an opposite direction. The valves 9 at the confronting edges thereof are centrally depressed so that a passage will be maintained therebetween under all conditions, and each of the said valves upon its said confronting end is formed with a depending portion 24 that is received in a depression 21 formed centrally of the valve seat 8 in the head 6. The depending portions 24 of the valves are disposed in the path of contact with spaced shoulders 23 formed at equi-distance from the center of the lower wall of the depression 21, the opposite end walls 22 of the said depression being disposed to contact with the inner edges of the depending portions 24 of the valves to limit the sliding movement of the valves in their open position, the inward movement being limited by contact with the shoulders 23.

Connected with the hollow head 6 are branch pipes 17 connected with the main pipe 19 which is in communication with a suitable source of fluid supply, such as the boiler of the locomotive. This pipe is under the control of a valve 19', and the branch pipes 18 are arranged to deliver fluid to the outer ends of the valves 9. The fluid is not designed as an actuating means for the valve, but is merely in the nature of a cleaning element whereby the valves as well as the valve seat will be cleaned of any accumulation of dust, soot, etc., which would ordinarily find a deposit thereon, incident to the fact that the device is arranged in the smoke box of the locomotive through which smoke and sparks pass in finding their way out of the stack 3. The valves rest snugly on their seat and are in contact with the cover plate for the head. The rear wall of each of the valves is provided with a substantially semi-cylindrical depression 25 that is arranged in a line with the inlets for the pipes 17. The sides of the valves are provided with similar depressions 26. In addition to this, the valves, from the rear ends thereof are centrally provided with spaced passages 27 having angle branches 29 that pass through the depending or enlarged inner ends of the said valves. Suitable ports 27' communicate with the passages 27 and the under face of the valves. The widened or depending portions at the inner ends of the valves may be grooved as at 30' in a line with the passages 28, and the upper faces of the valves are provided with transverse incurved portions 30, and upon their under faces with similar depressions 29. By this arrangement it will be seen that the steam from the boiler may be delivered to almost the entire surfaces of the valves as well as to the seat for the said valves. The confronting ends of the slidable valves 9 are provided with the usual central circular depressed portions 31, and from the foregoing description, when taken in connection with the drawings, the simplicity and advantages of the construction, will be apparent without further detailed description.

Having thus described the invention, what I claim is:

1. In combination with a locomotive having a nozzle arranged in the smoke box thereof, a hollow head on the nozzle, coöperating valves seated therein, means for simultaneously operating the valves, said valves having passages from their outer ends communicating with the bottom thereof and with the seat therefor, and valved fluid conducting pipes communicating with the head to the rear of said valves.

2. In combination with a locomotive having a nozzle in the smoke box thereof below the smoke stack and communicating with the exhaust of the locomotive, of a hollow head on the nozzle communicating therewith, a closure plate for the head, slidable valves seated in the head, said valves having passages from their outer ends communicating with the bottom thereof and with the seat therefor, valved fluid conducting pipes communicating with the interior of the head to the rear of the valves, an upstanding lug on each of the valves, said cover plate having elongated openings through which the lugs pass, toggle levers pivoted on the cover plate and loosely connected with the lugs of the valves, and an operating rod connecting the free arms of the toggle levers.

In testimony whereof I affix my signature.

JOSEPH R. GERARD.

Copies of this patent may be obtained for five cents each, by addressing the "Commissioner of Patents, Washington, D. C."